US010792852B2

(12) United States Patent
 Marumo

(10) Patent No.: US 10,792,852 B2
(45) Date of Patent: Oct. 6, 2020

(54) BLOW MOLD

(71) Applicant: NISSEI ASB MACHINE CO., LTD., Nagano (JP)

(72) Inventor: Kenji Marumo, Nagano (JP)

(73) Assignee: NISSEI ASB MACHINES CO., LTD., Nagano (JP)

( * ) Notice: Subject to any disclaimer, the term of this patent is extended or adjusted under 35 U.S.C. 154(b) by 140 days.

(21) Appl. No.: 16/305,267

(22) PCT Filed: May 29, 2017

(86) PCT No.: PCT/JP2017/019952
 § 371 (c)(1),
 (2) Date: Nov. 28, 2018

(87) PCT Pub. No.: WO2017/209066
 PCT Pub. Date: Dec. 7, 2017

(65) Prior Publication Data
 US 2020/0180205 A1    Jun. 11, 2020

(30) Foreign Application Priority Data

May 30, 2016 (JP) ................................. 2016-107792

(51) Int. Cl.
 *B29C 49/48* (2006.01)
 *B29C 49/54* (2006.01)
 (Continued)

(52) U.S. Cl.
 CPC .......... *B29C 49/4815* (2013.01); *B29C 33/44* (2013.01); *B29C 49/54* (2013.01);
 (Continued)

(58) Field of Classification Search
 CPC .............. B29C 49/54; B29C 2049/545; B29C 2049/4807; B29C 49/4815
 See application file for complete search history.

(56) References Cited

U.S. PATENT DOCUMENTS 2,784,455 A  *  3/1957  Pulaski .................. B29C 51/34
                                                           425/253
5,469,612 A     11/1995  Collette et al.

FOREIGN PATENT DOCUMENTS

CN    101 164 764 A    4/2008
CN    102380946        3/2012
               (Continued)

OTHER PUBLICATIONS

Extended European Search Report dated Dec. 3, 2019 in EP application No. 17806621.3.
(Continued)

*Primary Examiner* — Robert B Davis
(74) *Attorney, Agent, or Firm* — Greenblum & Bernstein, P.L.C.

(57) ABSTRACT

A blow mold includes: a pair of movable molds for forming engagement grooves of a container body; and advancing/retreating mechanism units for advancing and retreating the movable molds between a standby position and a molding position. The advancing/retreating mechanism units are equipped with drive shafts to which the movable molds are fixed and which are rotatably supported with respect to a cavity mold; actuator devices which each have a linear-motion shaft capable of advancing and retreating in a direction orthogonal to the drive shaft and which are each swingably provided with respect to the cavity mold; and link members each having an end side fixed to the drive shaft outside the cavity mold and an opposite end side coupled to the linear-motion shaft.

12 Claims, 10 Drawing Sheets

(51) Int. Cl.
*B29C 33/44* (2006.01)
*B29L 31/00* (2006.01)

(52) U.S. Cl.
CPC ............... *B29C 2049/4807* (2013.01); *B29C 2049/4892* (2013.01); *B29C 2049/545* (2013.01); *B29L 2031/7158* (2013.01)

(56) References Cited

FOREIGN PATENT DOCUMENTS

| | | | |
|---|---|---|---|
| CN | 204674010 | 9/2015 | |
| DE | 102017102383 A1 * | 8/2018 | ............ B29C 49/32 |
| JP | 11-314268 | 11/1999 | |
| JP | 2000-177741 | 6/2000 | |
| JP | 2000-280328 | 10/2000 | |
| WO | 95/15250 | 6/1995 | |
| WO | 2010/086370 | 8/2010 | |
| WO | 2016-062969 | 4/2016 | |

OTHER PUBLICATIONS

Official Action dated Mar. 17, 2020 in Chinese Application No. 2017-80033287X and English language translation thereof.
International Search Report in International Patent Application No. PCT/JP2017/019952, dated Aug. 15, 2017.

* cited by examiner

FIG.7(a)
FIG.7(b)
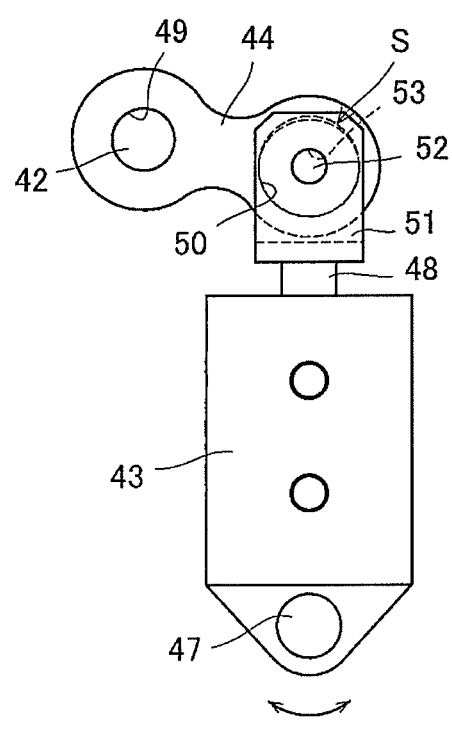
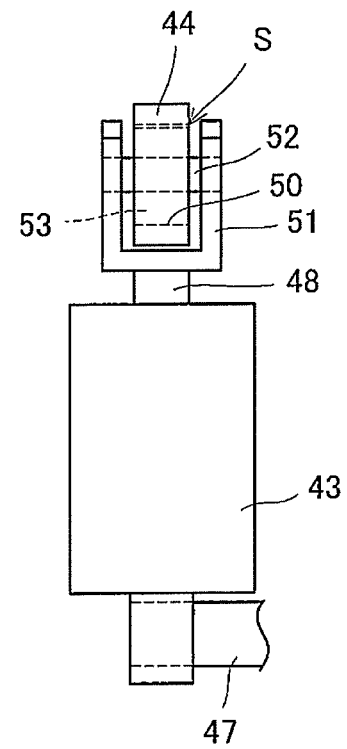

BLOW MOLD

TECHNICAL FIELD

This invention relates to a blow mold which is designed to blow-mold a container body having engagement grooves for engaging engagement projections of a handle.

BACKGROUND ART

As a container using a synthetic resin such as polyethylene terephthalate (PET), one equipped with a handle intended for easier handling has been available.

As a method for producing a handle-equipped container, it is known, for example, to dispose a handle together with a preform within a cavity mold and, in this state, blow-mold the preform, thereby integrating a container body and the handle to form a handle-equipped container. Further, a method is also known which comprises forming a container body by blow molding separately from a handle, and then retrofitting the container body with the handle (see, for example, Patent Document 1).

In retrofitting the container body with the handle, it is necessary to form engagement grooves, which are to be engaged with engagement projections of the handle, in the container body. The engagement grooves are formed by movable molds (insert dies) disposed within a cavity mold when the container body is blow-molded. It is known that at this time, each movable mold within the cavity mold is moved toward the container body at a predetermined timing, whereby the shapability of the engagement grooves can be enhanced.

A proposal has been made for a blow mold for realizing the operation of movable molds as stated above (see, for example, Patent Document 2). The blow mold described in Patent Document 2 is configured such that sliders 21, 22 to which inserts (movable molds) 16, 17 are fixed are brought into engagement with cams 3, 4 by pins 8, 9, and the cams 3, 4 are moved in a horizontal direction, whereby the inserts (movable molds) 16, 17 are moved upward and downward.

PRIOR ART DOCUMENTS

Patent Documents

Patent Document 1: JP-A-2000-177741
Patent Document 2: WO2010/086370

SUMMARY OF THE INVENTION

Problems to be Solved by the Invention

The blow mold described in Patent Document 2 enables each movable mold to be moved at an optional timing, as described above. Thus, engagement grooves can be formed satisfactorily for a container body and, accordingly, the mounting strength of a handle on the container body can be increased.

The blow mold described in Patent Document 2, however, may pose the problems that its structure is complicated and its cost is high, or the problem that its maintenance takes time and labor.

The present invention has been accomplished in the light of the above circumstances. It is an object of the invention to provide a blow mold which can move a pair of movable molds at an optional timing by use of a comparatively simple structure.

Means for Solving the Problems

A first aspect of the present invention, intended to solve the above problems, lies in a blow mold configured to blow-mold a container body having engagement grooves for engaging engagement projections of a handle, the blow mold comprising:

a pair of movable molds arranged within a cavity mold and provided with projections for forming the engagement grooves; and advancing/retreating mechanism units provided for the cavity mold and adapted to advance and the movable molds between a standby position and a molding position, wherein the advancing/retreating mechanism units are equipped with drive shafts to which the movable molds are fixed and which are rotatably supported with respect to the cavity mold, actuator devices which each have a linear-motion shaft capable of advancing and retreating in a direction orthogonal to the drive shaft and which are each swingably provided with respect to the cavity mold, and link members each having an end side fixed to the drive shaft outside the cavity mold and an opposite end side coupled to the linear-motion shaft.

A second aspect of the present invention lies in the blow mold according to the first aspect, wherein the advancing/retreating mechanism unit advances the linear-motion shaft of the actuator device, thereby swinging the projection of the movable mold from the standby position to the molding position.

A third aspect of the present invention is the blow mold according to the first or second aspect, further comprising a plurality of the cavity molds arranged adjacently, wherein the drive shaft is provided continuously over the plurality of cavity molds, and a plurality of the movable molds corresponding to the cavity molds are fixed to the drive shaft.

A fourth aspect of the present invention lies in the blow mold according to the third aspect, wherein the movable molds are fixed to the drive shaft such that the nearer a leading end of the drive shaft the movable mold is arranged, the smaller angle from the molding position to the standby position the movable mold has.

A fifth aspect of the present invention lies in the blow mold according to any one of the first to fourth aspects, wherein the cavity mold is composed of a pair of split molds, and the drive shaft is provided on one of the split molds along a parting surface of the split mold.

Effects of the Invention

According to the present invention described above, it is possible to realize a blow mold, which can move a pair of movable molds at an optional timing, with the use of a relatively simple structure. Using a blow molding apparatus having such a blow mold, a container body is formed. By so doing, engagement grooves can be satisfactorily formed (shaped) in the container body and, accordingly, the mounting strength of a handle on the container body can be enhanced.

BRIEF DESCRIPTION OF THE DRAWINGS

FIGS. 7(a), 7(b) are schematic views illustrating the configuration of an advancing/retreating mechanism unit according to the present invention, (a) being a front view, and (b) being a side view.

MODE FOR CARRYING OUT THE INVENTION

An embodiment of the present invention will now be described in detail by reference to the accompanying drawings.

First of all, an example of a handle-equipped container produced by a blow molding apparatus according to the present invention will be described. The shape of the handle-equipped container is an existing one, and thus will be briefly explained here.

Figure 1:
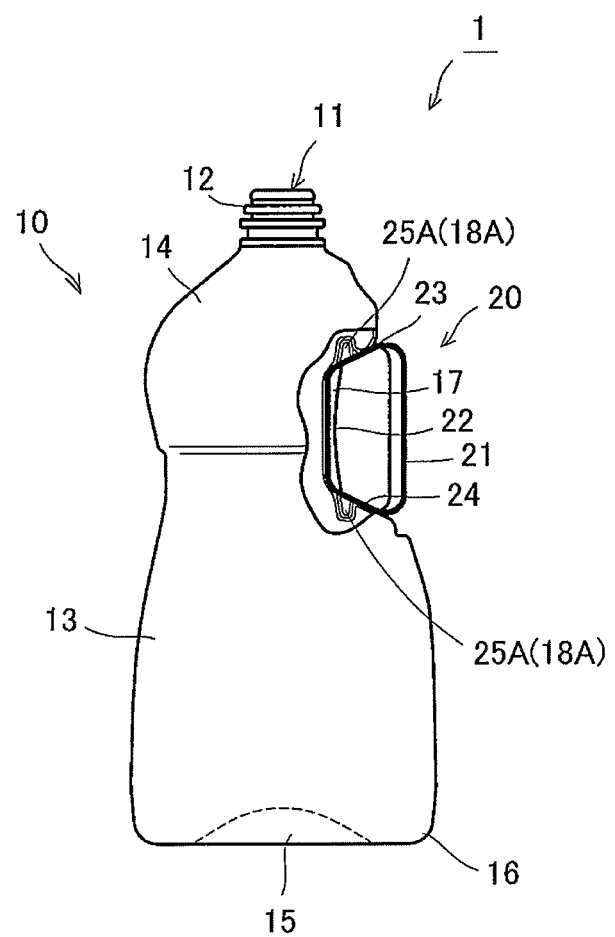
FIG. 1 is a view showing an example of a handle-equipped container which is formed by a blow mold according to the present invention.

A handle-equipped container 1 shown in FIG. 1 is a container to be filled with contents (liquid) such as water, and is provided with a container body 10 and a handle 20 each formed from a synthetic resin material. The container body 10 and the handle 20 are formed using synthetic resin materials. The container body 10 is formed, for example, from polyethylene terephthalate (PET) resin, and the handle 20 is formed, for example, from polypropylene (PP) or polyethylene (PE).

Figure 2:
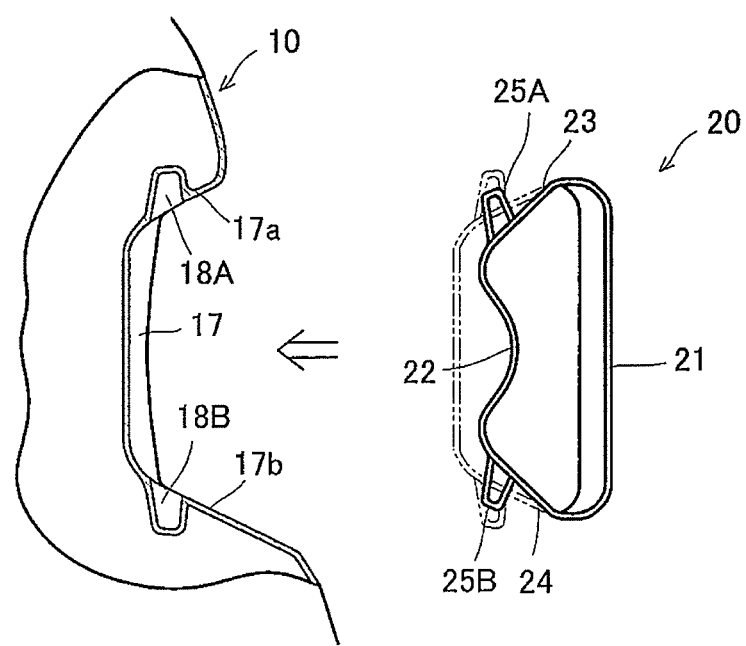
FIG. 2 is a partial enlarged view of the handle-equipped container showing a state in which a container body and a handle are separated from each other.

The container body 10 is composed of a neck 12 having an opening 11 at its upper end, a cylindrical barrel 13, a shoulder 14 connecting the neck 12 and the barrel 13 and gradually expanding from the neck 12, a bottom 15 sealing an end of the barrel 13, and a heel 16 connecting the barrel 13 and the bottom 15. As shown in FIGS. 1 and 2, the container body 10 is also formed with a concave portion 17 for mounting of the handle 20. In an upper surface 17a and a lower surface 17b of the concave portion 17, engagement grooves 18A and 18B as a pair are formed upward and downward, respectively. That is, the engagement groove 18A depressed upward is formed in the upper surface 17a of the concave portion 17, while the engagement groove 18B depressed downward is formed in the lower surface 17b of the concave portion 17. These engagement grooves 18A, 18B are engaged with engagement projections of the handle 20 as will be described later.

The handle 20 is formed in an annular shape having a grip portion 21 which is disposed in the concave portion 17 of the container body 10 along the vertical direction of the concave portion and which is gripped by a user; an opposing piece portion 22 opposing the grip portion 21; and an upper piece portion 23 and a lower piece portion 24 connecting the grip portion 21 and the opposing piece portion 22. An engagement projection 25A protruding upward is provided on the upper piece portion 23, and an engagement projection 25B protruding downward is formed on the lower piece portion 24. These engagement projections 25A, 25B are engaged with the engagement grooves 18A, 18B formed in the container body 10, whereby the handle 20 is fixed to the container body 10.

The handle-equipped container 1 according to the present embodiment is formed by mounting the handle 20 on the container body 10 after the container body 10 and the handle 20 are formed separately. First, the handle 20 is formed by injection molding, while the container body 10 is formed by blow-molding an injection-molded preform. Then, the handle 20 is assembled to the container body 10 to form the handle-equipped container 1. The manner of assembling the handle 20 is, for example, as follows: As shown in FIG. 2, the handle 20 is pressed vertically until it is deformed. In this state, the handle 20 is carried into the concave portion 17 of the container body 10, and the deformation of the handle 20 is released within the concave portion 17. As a result, the handle 20 is expanded vertically, whereupon the engagement projections 25A, 25B engage the engagement grooves 18A, 18B. Consequently, the handle 20 is fixed to the container body 10 to form the handle-equipped container 1.

The present invention relates to a blow molding apparatus for blow-molding the container body 10 constituting the above handle-equipped container 1 and, in particular, features a blow mold provided in the blow molding apparatus. The configuration of the blow mold according to the present invention will be described below.

Figure 3:
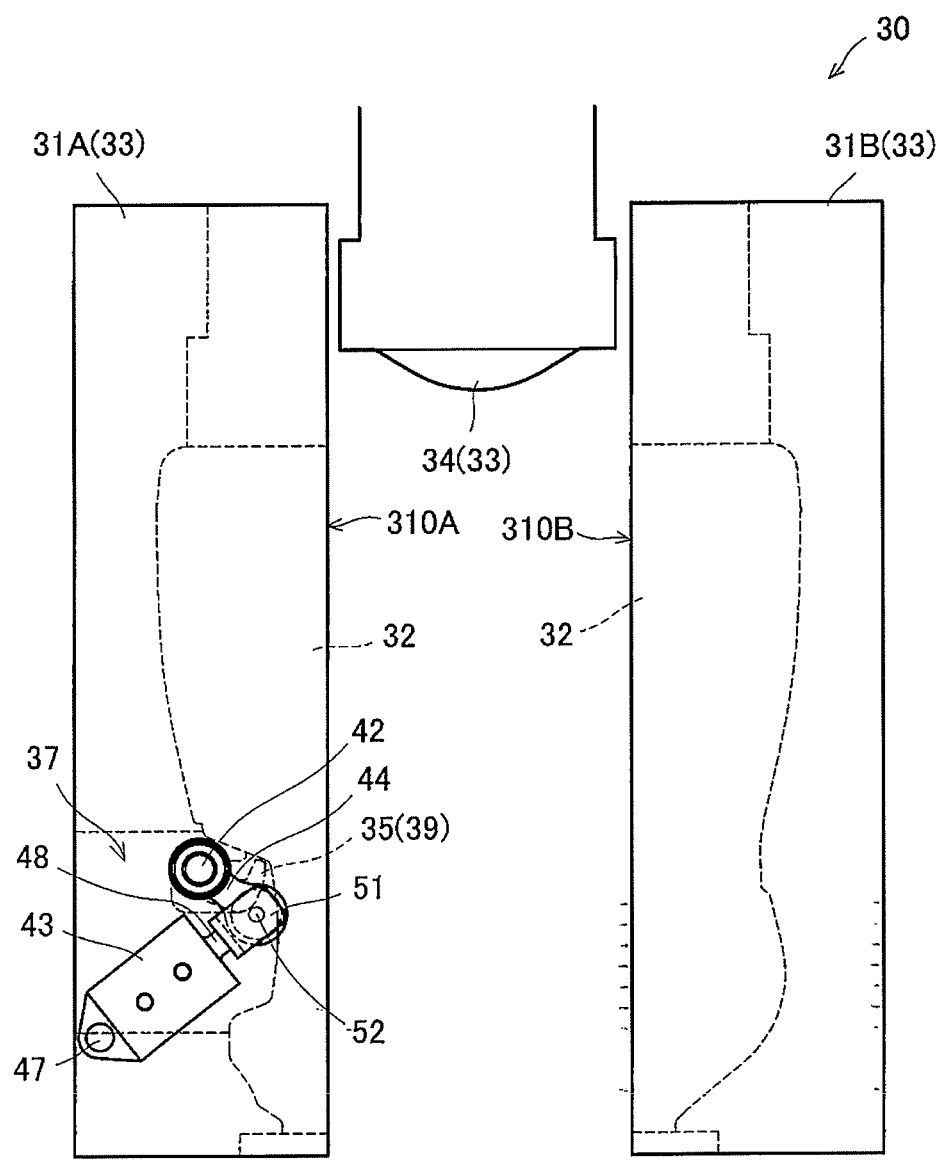
FIG. 3 is a front view showing the open state of the blow mold according to the present invention.
Figure 4:
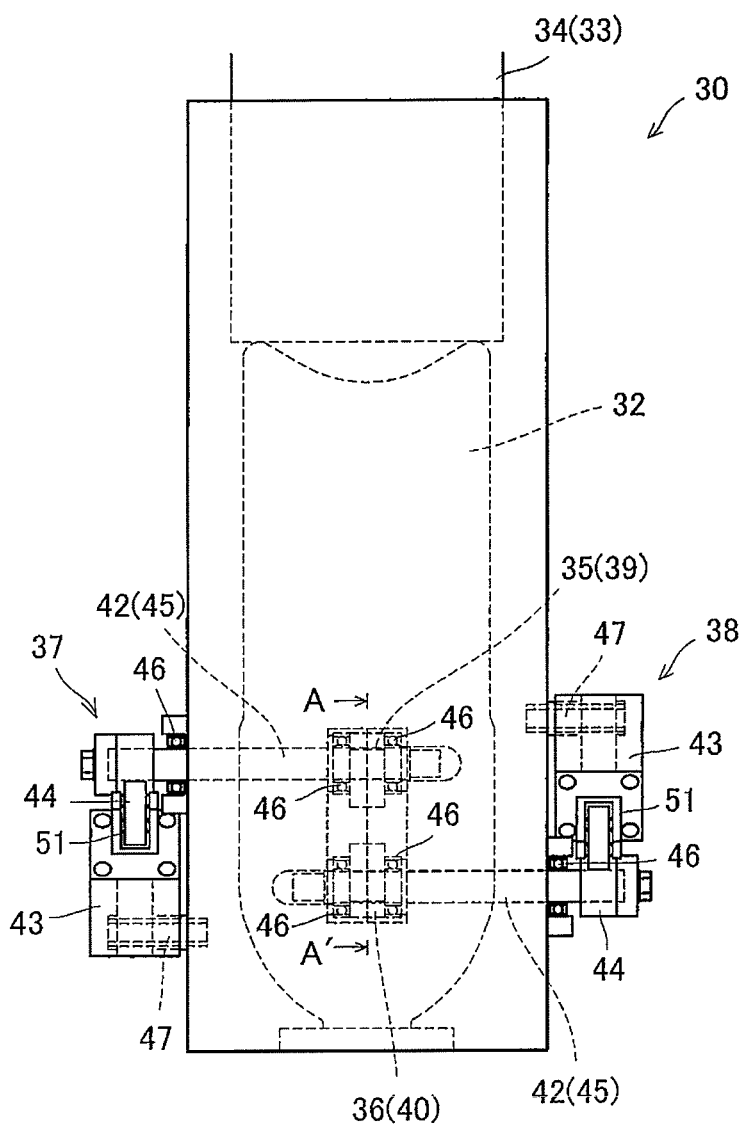
FIG. 4 is a right side view of a split mold constituting the blow mold according to the present invention.
Figure 5:
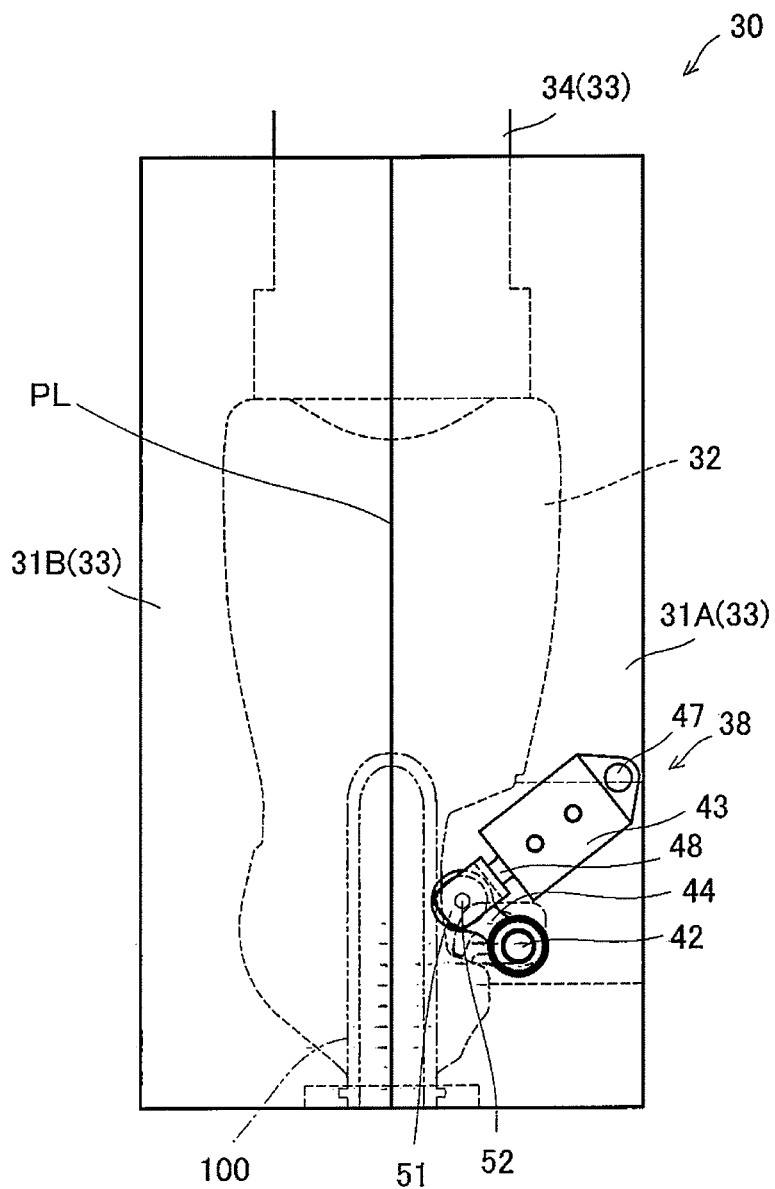
FIG. 5 is a rear view showing the closed state of the blow mold according to the present invention.

As shown in FIGS. 3 to 5, a blow mold 30 provided in the blow molding apparatus holds a preform (not shown), which has been molded by injection molding, in an inverted state and, blow-molds the preform in this state, thereby forming the container body 10.

The blow mold 30 has a cavity mold 33 composed of a pair of split molds 31A and 31B, and adapted to define a cavity 32, which is a space for accommodating a preform 100 (see FIG. 5), and a bottom mold 34 for forming the bottom 15 of the container body 10. The blow mold 30 is also provided with a neck mold for holding a neck portion of the preform, and a blow core mold for introducing air through an opening of the preform.

Furthermore, the blow mold 30 has a pair of movable molds (insert dies) 35 and 36 for forming the engagement grooves 18A, 18B of the container body 10, and advancing/retreating mechanism units 37, 38 for advancing and retreating the movable molds 35, 36. In this example, the movable mold 35 forms the engagement groove 18A in the upper surface 17a of the concave portion 17, and the movable mold 36 forms the engagement groove 18B in the lower surface 17b of the concave portion 17.

The movable molds 35, 36 are disposed within the one split mold 31A constituting the cavity mold 33. That is, the movable molds 35, 36 are disposed within the split mold 31A on the side where the concave portion 17 of the container body 10 is formed. In detail, as shown in enlarged sectional views as FIGS. 6(a), 6(b), the split mold 31A is formed with accommodation portions 39, 40 which are spaces for accommodation of the movable molds 35, 36. The movable molds 35, 36 are accommodated so as to be advanceable and retreatable (pivotable) within the accommodation portions 39, 40 by the advancing/retreating mechanism units (pivoting mechanism units) 37, 38. The split mold 31A is formed by combining a plurality of molds.

In more detail, the movable molds 35, 36 are provided with projections (pawls) 41 for forming (shaping) the engagement grooves 18A, 18B. The movable molds 35, 36 are configured to be pivotable between a standby position P1 where the projections 41 are accommodated within the accommodation portions 39, 40 (see FIG. 6(a)) and a molding position P2 where the projections 41 protrude from the accommodation portions 39, 40 into the cavity 32 (FIG. 6(b)).

Next, an explanation will be offered for the constitutions of the advancing/retreating mechanism units 37, 38 for advancing and retreating (pivoting) the movable molds 35, 36. The advancing/retreating mechanism unit 37 for advancing and retreating (pivoting) the movable mold 35, and the advancing/retreating mechanism unit 38 for advancing and retreating (pivoting) the movable mold 36 are each equipped with a drive shaft 42, an actuator device 43, and a link member 44. The advancing/retreating mechanism unit 37 for advancing and retreating the movable mold 35, and the advancing/retreating mechanism unit 38 for advancing and retreating the movable mold 36 have the same configuration. Thus, the advancing/retreating mechanism unit (pivoting mechanism unit) 37 for advancing and retreating (pivoting) the movable mold 35 will be described below.

The drive shaft 42 provided in the advancing/retreating mechanism unit 37 is rotatably held by the split mold 31A constituting the cavity mold 33. In detail, an insertion hole 45 through which the drive shaft 42 is inserted is provided in the split mold 31A along a parting surface 310A (310B). The insertion hole 45 starts on one side of the split mold 31A, communicates with the accommodation portion 39, and continues on to the opposite side of the accommodation portion 39. The parting surface 310A is a surface on which the split mold 31A makes contact with the split mold 31B during mold closure, and the parting surface 310B is a surface on which the split mold 31B makes contact with the split mold 31A during mold closure (see FIG. 3). The parting surface 310A (310B) is configured as a nearly flat surface, except the site where the cavity 32 is formed. Traces of the parting surfaces 310A, 310B visible from the sides of the split molds 31A, 31B (cavity mold 33) define a parting line PL (see FIG. 5). In a closed state, the sides of the split molds 31A, 31B are connected together in orthogonal relationship with the parting surfaces 310A, 310B.

The drive shaft 42 is inserted through the insertion hole 45, and the movable mold 35 disposed within the accommodation portion 39 is fixed to the drive shaft 42. That is, the movable mold 35 is integrated with the drive shaft 42, and rotates in conjunction with the drive shaft 42. The drive shaft 42 is extended to the outside of the split mold 31A, and is coupled to the actuator device 43 outwardly of the split mold 31A. A support structure for the drive shaft 42 is not particularly limited. In the present embodiment, however, the drive shaft 42 is supported by bearing members 46, for example, composed of ball bearings, which are provided on both sides of the movable mold 35 and outside the split mold 31A.

The actuator device 43, as shown in FIGS. 7(a), 7(b), has a linear-motion shaft advanceable and retreatable in a direction orthogonal to the drive shaft 42, and is provided to be swingable with respect to the cavity mold 33. The actuator device 43 is composed of, say, an air cylinder or the like, and is mounted on one side of the split mold 31A. In the present embodiment, the actuator device 43 is fixed to the side of the split mold 31A by a fixing pin 47, and is rotatable (swingable) about the fixing pin 47 as a fulcrum.

As will be described in detail later, the actuator device 43 provided on the side of the split mold 31A is operated to advance or retreat (advance/retreat) a rod (linear-motion shaft) 48 along the surface (side) of the split mold 31A, whereby the movable mold 35 pivots within the accommodation portion 39.

A link member 44 is a member for connecting the rod 48 of the actuator device 43 and the drive shaft 42. The link member 44 is disposed along the surface of the split mold 31A in a direction crossing the rod 48 and, on one end side thereof, is formed with a fixing hole 49 for fixation of the drive shaft 42. The drive shaft 42 is fitted into the fixing hole 49, and the link member 44 is integrated with the drive shaft 42 and the movable mold 35. When the link member 44 is rotated along the surface of the split mold 31A, therefore, the drive shaft 42 and the movable mold 35 are also rotated accordingly.

On the other end side of the link member 44, a coupling hole 50 for coupling of the rod 48 of the actuator device 43 is formed. The link member 44 is coupled to the rod 48 via the coupling hole 50. That is, the link member 44 and the rod 48 are coupled together by the coupling hole 50 so as to be swingable with respect to each other. In other words, the link member 44 is coupled to the rod 48 so as to be driven in accordance with the movement of the actuator device 43. A coupling structure for the link member 44 and the rod 48 is not particularly limited, but in the present embodiment, the link member 44 and the rod 48 are coupled together by a knuckle member 51 and a hinge pin 52.

In detail, the knuckle member 51 is a nearly U-shaped member provided interiorly with a space for disposing the link member 44 (see FIG. 7(b)). An opposite end part of the link member 44 formed with the coupling hole 50 is disposed inside the U-shaped knuckle member 51. The hinge pin 52 is loosely fitted in the coupling hole 50 of the link member 44, and both ends of the hinge pin 52 are fixed to the knuckle member 51. As a result, the link member 44 and the rod 48 of the actuator device 43 are coupled to be swingable with respect to each other.

In the present embodiment, a contact member 53 comprising a rotatable roller composed, for example, of a ball bearing is fixed to the hinge pin 52, and the contact member 53 is loosely fitted in the circular coupling hole 50 of the link member 44. That is, the coupling hole 50 has an inner diameter slightly larger than the outer diameter of the contact member 53, and a slight clearance S is formed between the contact member 53 and the link member 44, with the contact member 53 being fitted into the coupling hole 50. The size of the clearance S is not particularly limited, but is preferably of the order of 0.2 mm to 1.5 mm, more preferably of the order of 1.0 mm, with the coupling hole 50 and the contact member 53 in contact. In the present embodiment, the link member 44 and the rod 48 are coupled swingably via the contact member 53, but the contact member 53 need not necessarily be provided. That is, the hinge pin 52 may be provided slidably in the coupling hole 50, without provision of the contact member 53.

Figure 6A:
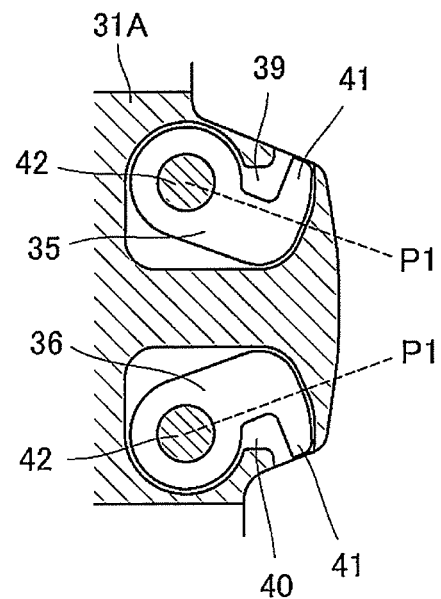
FIGS. 6(a), 6(b) are views illustrating movable molds of the blow mold according to the present invention, the views taken on line A-A' in FIG. 4.
Figure 6B:
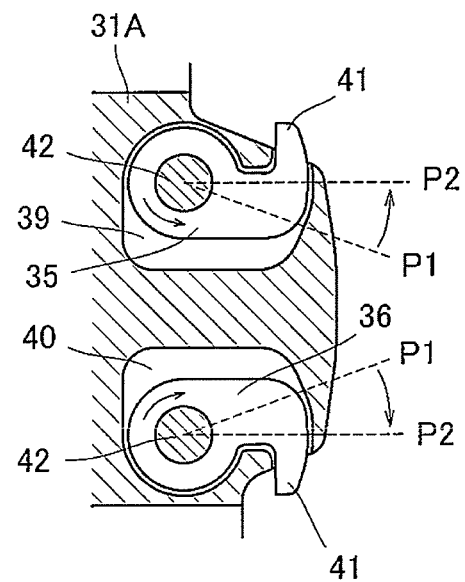
Figures 8A, 8B:
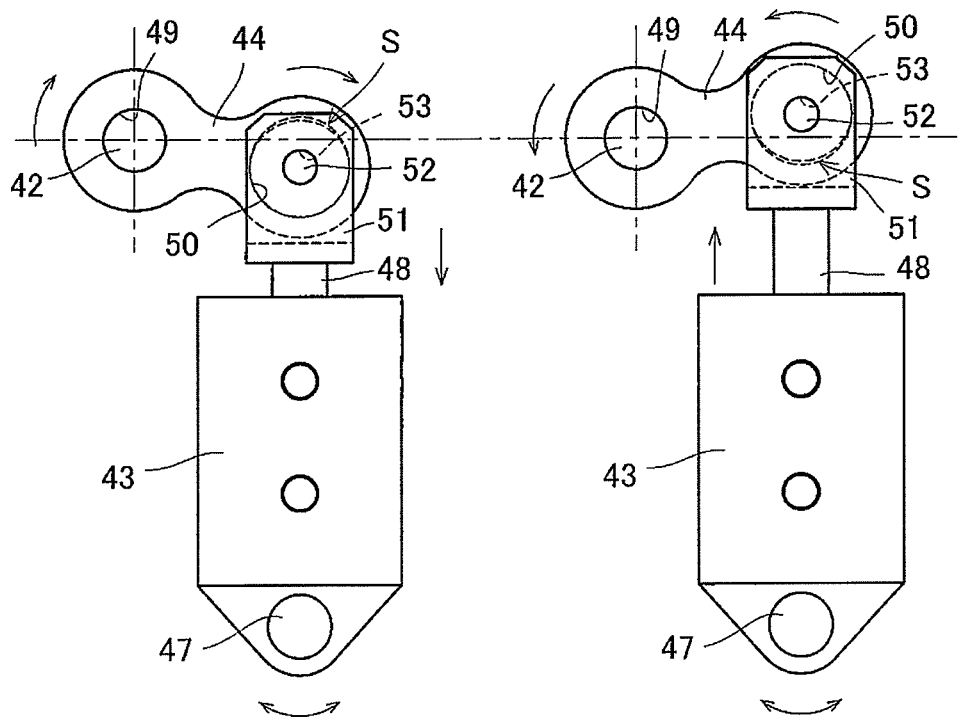
FIGS. 8(a), 8(b) are schematic views illustrating the actions of the advancing/retreating mechanism unit according to the present invention.

With the blow mold 30 equipped with the advancing/retreating mechanism unit 37 of the above configuration, when the actuator device 43 is not in operation (a state where the rod 48 does not advance), as shown in FIG. 8(a), the movable mold 35A is placed at the standby position P1 (see FIG. 6(a)). At this time, the contact member 53 is in contact with the link member 44 on the proximal end side of the rod 48.

When the actuator device 43 is operated to advance the rod 48, as shown in FIG. 8(*b*), the drive shaft 42 is rotated via the link member 44. On this occasion, the actuator device 43 swings about the fixing pin 47 in accordance with the rotation of the link member 44. Thus, the movable mold 35 pivots together with the drive shaft 42 and moves from the standby position P1 to the molding position P2 (FIG. 6(*b*)). At this time, the contact member 53 rolls on the inner peripheral surface of the coupling hole 50, and then contacts the link member 44 on the leading end side of the rod 48.

When the actuator device 43 is operated from the state of disposition of the movable mold 35 at the molding position P2 (FIG. 6(*b*)) to retreat the rod 48 (FIG. 8(*a*)), the movable mold 35 rotates together with the drive shaft 42 in a reverse direction, and moves to the standby position P1 again (FIG. 6(*a*)).

Like the above-mentioned movable mold 35, the movable mold 36 is also pivotable, as appropriate, between the standby position P1 and the molding position P2 by means of the advancing/retreating mechanism unit 38, although an explanation for this is omitted.

According to the blow mold 30 concerned with the present embodiment, as described above, the pair of movable molds 35, 36 can be appropriately pivoted at an optional timing by a relatively simple structure. The blow mold 30 according to the present embodiment, moreover, enables an apparatus to be assembled relatively easily, because it has a relatively simple structure. For example, the rod 48 of the actuator device 43 and the link member 44 can be coupled together by loosely fitting the contact member 53 into the coupling hole 50 provided with the relatively large clearance S as mentioned above, thus making an assembly operation relatively easy. It is to be noted that according to the configuration of the present embodiment, even if some clearance S is formed between the contact member 53 and the link member 44, the movable molds 35, 36 can be appropriately pivoted. This is because the distance over which, and the direction in which, the rod 48 advances can be adjusted by the actuator device 43 swingable (pivotable) about the fixing pin 47 as the fulcrum, and the contact member 53 rolls within the clearance S to alleviate an impact.

By forming the container body 10 with the use of such a blow mold 30, the engagement grooves 18A, 18B can be formed (shaped) satisfactorily in the container body 10. Concretely, when the preform 100 is blow-molded to form the container body 10, the movable mold 36 close to the neck 12 is moved from the standby position P1 to the molding position P2, as s first step. By so doing, the preform 100 (resin material) is appropriately pressed by the movable mold 36 to form (shape) the engagement groove 18A. Further, a predetermined time after the movement of the movable mold 36, the movable mold 35 is moved from the standby position P1 to the molding position P2 to form the engagement groove 18B. Thus, with the preform 100 in a fully expanded state, the resin material is pressed by the movable mold 35, whereby the engagement groove 18B is formed. Consequently, the shapability of the engagement groove 18B can be enhanced.

Since the engagement grooves 18A, 18B are formed satisfactorily, moreover, the mounting strength of the handle 20 on the container body 10 can be increased. The timings for pivoting the movable molds 35, 36 may be determined, as appropriate, in conformity with the expansion rate of the preform 100 and so on.

Figure 9:
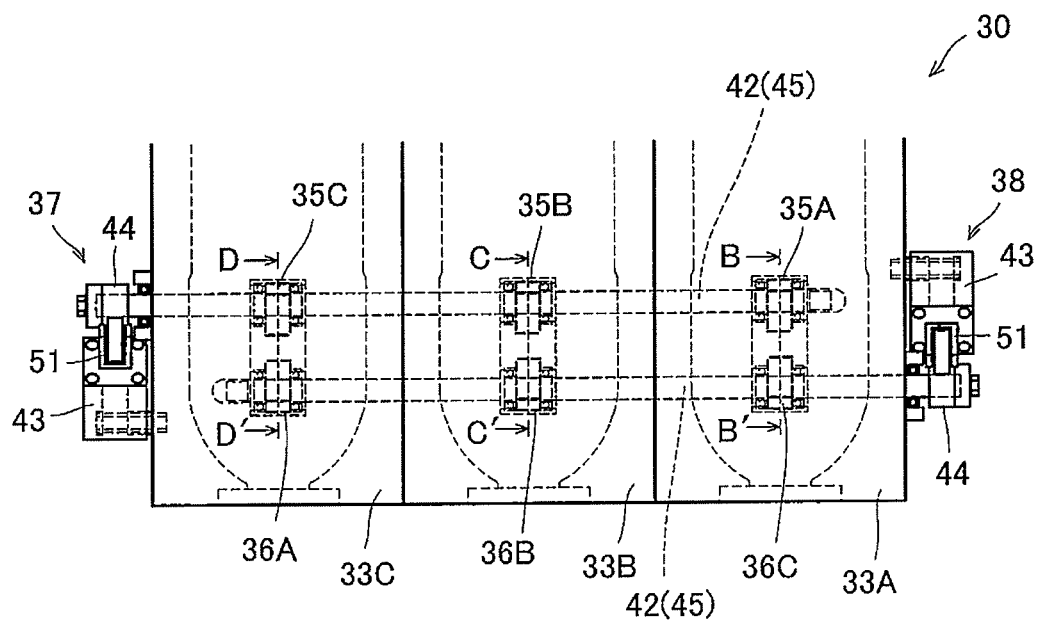
FIG. 9 is a front view showing another example of the blow mold according to the present invention.

In the foregoing embodiment, the configuration in which the blow mold 30 has the single cavity mold 33 is illustrated. However, the blow mold 30 according to the present invention is not limited to this configuration. As shown in FIG. 9, for example, the blow mold 30 may have a plurality of (for example, three) cavity molds 33A, 33B, 33C arranged adjacently. In this case, the drive shaft 42 which each advancing/retreating mechanism unit 37 or 38 has may be provided so as to be continuous over the plurality of cavity molds 33A, 33B, 33C, and a plurality of movable molds 35 or 36 corresponding to the respective cavity molds 33A, 33B, 33C may be fixed to the drive shaft 42.

According to the above-described configuration, the plural pairs of movable molds 35, 36 corresponding to the plurality of cavity molds 33A, 33B, 33C can be pivoted by the set of actuator devices 43 provided in the respective advancing/retreating mechanism units 37, 38. Hence, the structure of the blow mold 30 can be simplified further. Needless to say, the drive shaft 42 may be provided independently for each of the cavity molds 33A, 33B, 33C.

Figure 10A:
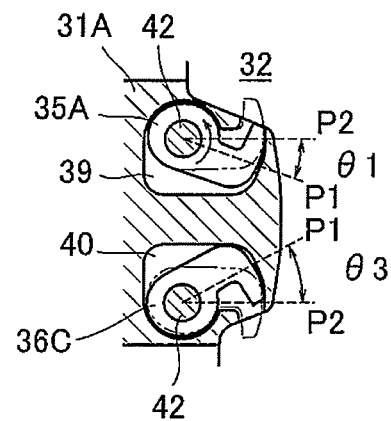
FIGS. 10(a) to 10(c) are views illustrating movable molds of the blow mold according to the present invention, (a) being a sectional view taken on line B-B' in FIG. 9, (b) a sectional view taken on line C-C' in FIG. 9, and (c) a sectional view taken on line D-D' in FIG. 9.
Figure 10B:
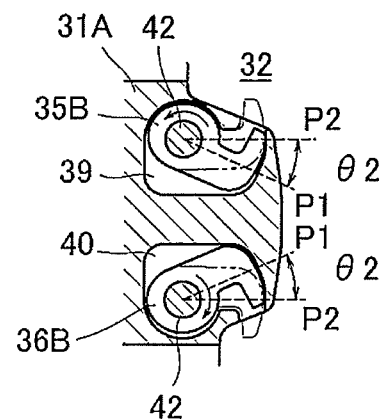
Figure 10C:
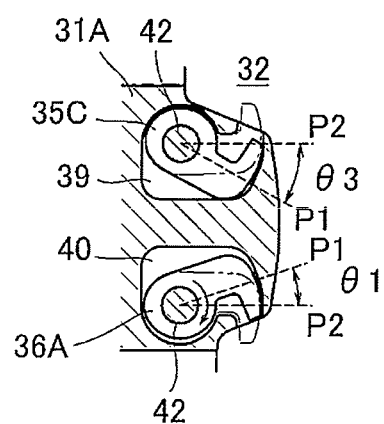

In case the plurality of movable molds 35 (35A, 35B, 35C) or 36 (36A, 36B, 36C) are fixed to the single drive shaft 42 as above, it is preferred that the movable molds 35 (35A, 35B, 35C) or 36 (36A, 36B, 36C) be fixed to the drive shaft 42 with phase differences being provided therebetween. Concretely, as shown in FIG. 9 and FIGS. 10(*a*) to 10(*c*), it is preferred that the movable molds 35 (35A, 35B, 35C) or 36 (36A, 36B, 36C) be fixed to the drive shaft 42 so that the closer to the leading end of the drive shaft 42 they are arranged, the smaller their angles from the molding position P2 to the standby position P1 become. That is, the angle $\theta 1$ of the movable molds 35A, 36A arranged on the leading end side of the drive shaft 42, the angle $\theta 2$ of the movable molds 35B, 36B arranged beside the actuator device 43 relative to the movable molds 35A, 36A, and the angle $\theta 3$ of the movable molds 35C, 36C arranged beside the actuator device 43 relative to the movable molds 35B, 36B preferably satisfy the relationship $\theta 1 < \theta 2 < \theta 3$.

Because of these features, the engagement grooves 18A, 18B can be formed by the movable molds 35, 36 more accurately. In forming (shaping) the engagement grooves 18A, 18B in the container body 10, the movable molds 35, 36 arranged on the side nearer the leading end of the drive shaft 42 are more apt to undergo a reaction force from the preform 100 (resin material). For example, the engagement grooves 18A, 18B to be formed by the movable molds 35A, 36A arranged on the side closest to the leading end of the drive shaft 42 are apt to have unstable shapes. By setting the angles of the plurality of movable molds 35 or 36 fixed to the single drive shaft 42 so as to satisfy the above-mentioned relationship, however, the engagement grooves 18A, 18B can be formed satisfactorily even by the movable molds 35, 36 fixed at any positions of the drive shafts 42. The magnitudes of the angles of the movable molds 35, 36 are not particularly limited, but may be determined as appropriate.

It goes without saying that if the reaction force from the preform 100 is small enough to exert no substantial influence on the shape stability of the engagement grooves 18A, 18B, the angles $\theta 1$, $\theta 2$, $\theta 3$ of the movable molds 35, 36 may be coincident. Thus, the angles of the three movable molds 35 or 36 arranged on the drive shaft 42 have only to satisfy the relationship $\theta 1 \leq \theta 2 \leq \theta 3$.

If two of the movable molds are arranged on the drive shaft in a configuration in which the blow mold is equipped with two of the blow cavity molds, the angle $\theta 1$ of the movable mold arranged on the side closest to the leading end of the drive shaft, and the angle $\theta 2$ of the movable mold arranged on the actuator device side relative to the above movable mold are required only to satisfy the relationship θ1≤θ2.

The embodiment of the present invention has been described above, but it is to be understood that the invention is in no way limited to this embodiment. The present invention can be changed or modified, as appropriate, without departing from its spirit and scope.

EXPLANATIONS OF LETTERS OR NUMERALS

1 Handle-equipped container
10 Container body
17 Concave portion
17a Upper surface
17b Lower surface
18A, 18B Engagement groove
20 Handle
21 Grip portion
22 Opposing piece portion
23 Upper piece portion
24 Lower piece portion
25A, 25B Engagement projection
30 Blow mold
31A, 31B Split mold
32 Cavity
33 Cavity mold
34 Bottom mold
35, 36 Movable mold (insert die)
37, 38 Advancing/retreating mechanism unit (pivoting mechanism unit)
39, 40 Accommodation portion
41 Projection (pawl)
42 Drive shaft
43 Actuator device
44 Link member
45 Insertion hole
46 Bearing member
47 Fixing pin
48 Rod
49 Fixing hole
50 Coupling hole
51 Knuckle member
52 Hinge pin
53 Contact member
100 Preform
310A, 310B Parting surface
PL Parting line

The invention claimed is:

1. A blow mold configured to blow-mold a container body having engagement grooves for engaging engagement projections of a handle, comprising:
   a pair of movable molds arranged within a cavity mold and provided with projections for forming the engagement grooves; and
   advancing/retreating mechanism units provided for the cavity mold and adapted to advance and retreat the movable molds between a standby position and a molding position,
   wherein the advancing/retreating mechanism units are equipped with
   drive shafts to which the movable molds are fixed and which are rotatably supported with respect to the cavity mold,
   actuator devices which each have a linear-motion shaft capable of advancing and retreating in a direction orthogonal to the drive shaft and which are each swingably provided with respect to the cavity mold, and
   link members each having an end side fixed to the drive shaft outside the cavity mold and an opposite end side coupled to the linear-motion shaft.

2. The blow mold according to claim 1, wherein the advancing/retreating mechanism unit advances the linear-motion shaft of the actuator device, thereby swinging the projection of the movable mold from the standby position to the molding position.

3. The blow mold according to claim 1,
   further comprising a plurality of the cavity molds arranged adjacently,
   wherein the drive shaft is provided continuously over the plurality of cavity molds, and
   a plurality of the movable molds corresponding to the cavity molds are fixed to the drive shaft.

4. The blow mold according to claim 3, wherein the movable molds are fixed to the drive shaft such that the nearer a leading end of the drive shaft the movable mold is arranged, the smaller angle from the molding position to the standby position the movable mold has.

5. The blow mold according to claim 1, wherein the cavity mold is composed of a pair of split molds, and the drive shaft is provided on one of the split molds along a parting surface of the split mold.

6. The blow mold according to claim 2,
   further comprising a plurality of the cavity molds arranged adjacently,
   wherein the drive shaft is provided continuously over the plurality of cavity molds, and
   a plurality of the movable molds corresponding to the cavity molds are fixed to the drive shaft.

7. The blow mold according to claim 6, wherein the movable molds are fixed to the drive shaft such that the nearer a leading end of the drive shaft the movable mold is arranged, the smaller angle from the molding position to the standby position the movable mold has.

8. The blow mold according to claim 2, wherein the cavity mold is composed of a pair of split molds, and the drive shaft is provided on one of the split molds along a parting surface of the split mold.

9. The blow mold according to claim 3, wherein the cavity mold is composed of a pair of split molds, and the drive shaft is provided on one of the split molds along a parting surface of the split mold.

10. The blow mold according to claim 6, wherein the cavity mold is composed of a pair of split molds, and the drive shaft is provided on one of the split molds along a parting surface of the split mold.

11. The blow mold according to claim 4, wherein the cavity mold is composed of a pair of split molds, and the drive shaft is provided on one of the split molds along a parting surface of the split mold.

12. The blow mold according to claim 7, wherein the cavity mold is composed of a pair of split molds, and the drive shaft is provided on one of the split molds along a parting surface of the split mold.

* * * * *